United States Patent [19]
Luce

[11] Patent Number: 4,970,991
[45] Date of Patent: * Nov. 20, 1990

[54] ANIMAL SAFETY BELT

[75] Inventor: Therese G. Luce, 311 Garden Trail, Pottawattomie Park, Michigan City, Ind. 46360

[73] Assignee: Therese G. Luce, Michigan City, Ind.

[*] Notice: The portion of the term of this patent subsequent to Jan. 30, 2007 has been disclaimed.

[21] Appl. No.: 432,469

[22] Filed: Nov. 7, 1989

Related U.S. Application Data

[63] Continuation-in-part of Ser. No. 202,781, Jun. 3, 1988, Pat. No. 4,896,630.

[51] Int. Cl.$^5$ ............................................. A01K 27/00
[52] U.S. Cl. .................................. 119/96; 119/109
[58] Field of Search ........................... 119/96, 106, 109

[56] References Cited

U.S. PATENT DOCUMENTS

| | | | |
|---|---|---|---|
| 1,508,601 | 9/1924 | Huff | 119/96 |
| 1,614,083 | 1/1927 | Plantico | 119/96 |
| 2,132,556 | 10/1938 | Blackshaw | 119/96 |
| 2,909,154 | 10/1959 | Thomas | 119/96 |
| 3,310,034 | 3/1967 | Dishart | 119/96 |
| 3,428,029 | 2/1969 | Klickstein et al. | 119/96 |
| 4,252,084 | 2/1981 | Willow | 119/96 |
| 4,273,215 | 6/1981 | Leggett | 119/96 X |
| 4,597,359 | 7/1986 | Moorman | 119/96 X |
| 4,676,198 | 6/1987 | Murray | 119/96 |
| 4,715,618 | 12/1987 | Harris | 119/96 X |

FOREIGN PATENT DOCUMENTS

| | | | |
|---|---|---|---|
| 1174917 | 9/1984 | Canada | 119/96 |
| 8800540 | 1/1988 | European Pat. Off. | 119/96 |
| AT/86/00047 | 7/1986 | PCT Int'l Appl. | |

Primary Examiner—Gene Mancene
Assistant Examiner—R. Thomas Price
Attorney, Agent, or Firm—Myers & Assoc., Ltd.

[57] ABSTRACT

An animal safety belt disclosed herein includes, an upper and a lower restraint, a front and a rear strap, a binding loop and a selective binding strap. Each is fabricated from woven webbing. The upper restraint is of predetermined length having a plurality of loops for inserting the straps therethrough and is adapted to be disposed adjacent the spine of the animal. The lower restraint is of predetermined length having a plurality of loops for inserting the straps therethrough and is adapted to be disposed adjacent the stomach and chest of the animal. The front strap is secured to the upper and lower restrainsts by being passed through forward loops. A buckle, disposed to an end of the front strap, adjusts the front loop circumference. The rear strap is attached to a rearward loop of said upper restraint and a corresponding loop of said lower restraint and also has a buckle for adjusting the circumference of a rear loop. The binding loop is affixed to a restraint for securing it to a seat belt or a truck structural element. A binding strap is selectively received by the binding loop to secure a restraint to a truck structural element.

28 Claims, 8 Drawing Sheets

ANIMAL SAFETY BELT

RELATED APPLICATION DATA

This application is a continuation in part of United States Patent Application Ser. No. 07/202,781, filed June 3, 1988, U.S. Pat. No. 4,896,630 by the same inventor as this application and is unassigned, as is this application. A claim for priority for the common elements between the applications is made under the authority of 35 U.S.C. 120, and the specification and drawing of application Ser. No. 07/202,781 is incorporated by reference herein.

BACKGROUND OF THE INVENTION

The animal safety belt of the present invention relates to an animal harness and particularly relates to an animal safety harness to be used in vehicles.

Both a harness and safety harness are the subject of issued patents. U.S. Pat. No. 4,676,198 (to Murray); 3,310,034 (to Dishart) describe a safety harness (but note FIG. 3 of Murray and 9 of Dishart) and in part appear to be primarily adapted to utilize the vehicle safety restraints similar to that for persons with safety harness. Murray also shows the use of its harness in the bed of a truck. U.S. Pat. No. 1,614,083 (to Plantico) describes a dog harness as does U.S. Pat. No. 1,508,601 (to Huff). Dishart and Plantico show buckles inter-fitting with holes in longitudinal members which may be adjusted to a limited degree to accommodate the differing lengths of animals. It is not apparent that Murray is adjustable. Additionally, U.S. Pat. No. 2,132,556 (to Blackshaw) shows a safety harness for a child with braces slidably connected to a belt, but Blackshaw does not appear to be directed to accepting shock loads, rather being in the nature of a restraint. U.S. Pat. No. 4,597,359 (to Moorman) shows a vehicle safety platform for pets secured by a seat belt for humans. U.S. Pat. No. 4,715,618 (to Harris) also shows a vehicle safety harness for pets including a lower half jacket secured by diagonal straps. Canada Pat. No. 1,174,917 (to Mader) shows a safety and holding belt for domestic animals having a leash which interconnects with a human seat belt. PAT-/AT86/00047 publication (to Krallert) shows an arrangement similar to Mader. The Apr., 16, 1987 International Search Report for PCT/AT86/00047 lists other documents which may be of some pertinency.

It is desirable to have a safety harness adjustable over a wider range of animal lengths and girths while preserving the strength of the longitudinal members as much as possible. It is also desirable to have a safety harness which may be employed in both passenger vehicles and in truck beds.

SUMMARY OF THE INVENTION

An animal safety belt includes an upper and a lower restraint, a front and a rear strap, and securement means. The upper restraint is of predetermined length having at least three upper attachment means for attaching straps and is adapted to be disposed adjacent the spine of the animal.

The lower restraint is of predetermined length having at least three lower attachment means for attaching straps and is adapted to be disposed adjacent the stomach and chest of the animal.

The front strap is secured to the upper and lower restraints by being passed through loops acting as attachment means. Adjustable loop means for adjusting the circumference of a front loop is disposed to an end of the front strap. The rear strap is attached to a rearward attachment means of said upper restraint and a corresponding attachment means of said lower restraint and also has an adjustable loop means. The binding means is affixed the restraint for securing the animal to a structural member of a vehicle or a safety harness for humans.

DETAILED DESCRIPTION OF THE DRAWINGS

Figure 1:
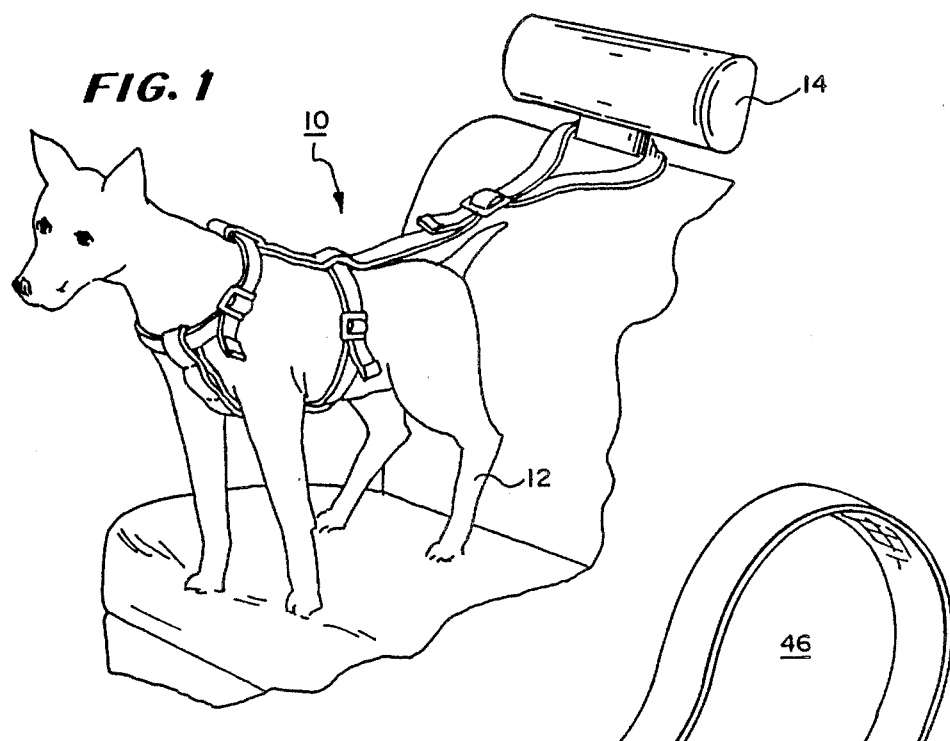
FIG. 1 is a perspective view of the animal safety belt of the present invention showing a restrained dog in a vehicle seat.

FIG. 1 shows the animal safety belt 10 of the present invention restraining a dog 12 by being secured to a head rest 14 of a vehicle. Head rest 14 has sufficient strength to be considered a structural element of the vehicle.

Figure 2:
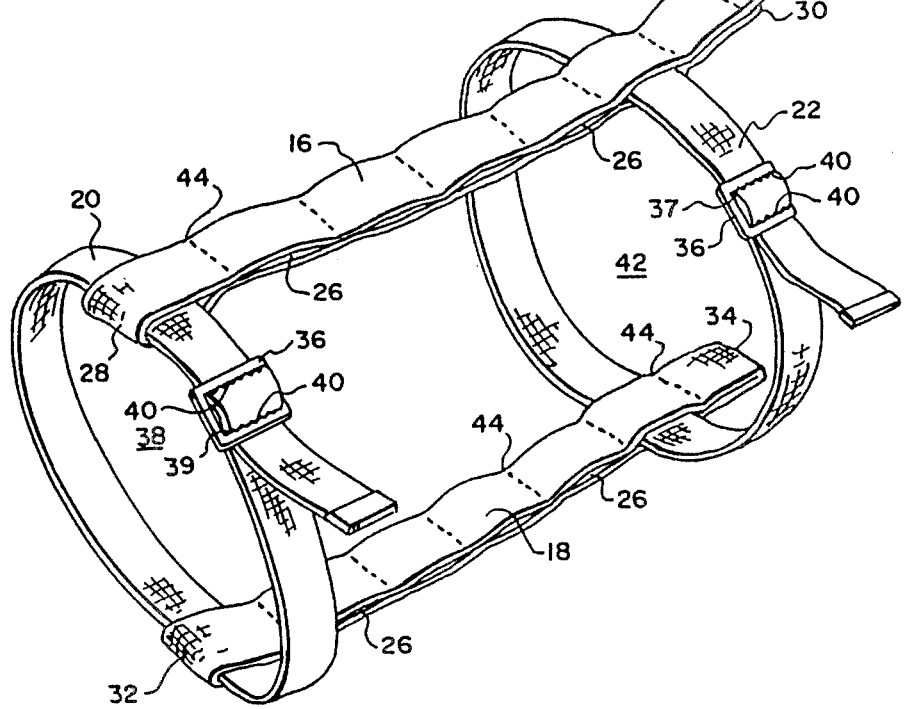
FIG. 2 is an enlarged perspective view of the invention.

As better seen in FIG. 2, the animal safety belt 10 includes an upper restraint 16, a lower restraint 18, a front strap 20, a rear strap 22 and securement means 24. Preferably restraints 16, 18, straps 20, 22 and securement means 24 are each fabricated from a woven webbing. The woven webbing may be fabricated from appropriate natural fibers e.g. cotton or synthetic fibers e.g. nylon or polyester. The use of woven webbing tends to better absorb shock loads and facilitate the stability of the safety belt fitting on an animal.

Upper restraint 16 has loops 26 extending through restraint 16 disposed at preferably even intervals between upper front end 28 and upper rear end 30 to serve as upper attachment means. Similarly, lower restraint 18 has loops 26 extending through restraint 18 disposed at even intervals between lower front end 32 and lower rear end 34 to serve as lower attachment means. Loops 26 extend transversely to the lengths of restraints 16 and 18. Front strap 20 is secured to upper restraint 16 by being inserted through a loop 26 adjacent upper front end 28. Similarly, front strap 20 is secured to lower restraint 18 by being inserted through a loop 26 adjacent lower front end 32. Webbing buckle 36 is secured near an end of front strap 20 to serve as adjustable loop means to vary the size of front loop 38. The circumference of front loop 38 should be adjusted to fit snugly about the neck of a restrained animal. Webbing buckle 36 defines webbing orifices 37, 39 for receiving strap 20, and the stability of adjustment is enhanced by opposing teeth 40 in each orifice 37, 39 engaging the webbing of front strap 20 to oppose strap movement in either direction. Rear strap 22 is secured to upper restraint 16 by being inserted through a loop 26 toward the upper rear end 30 of upper restraint 16. Similarly, rear strap 22 is secured to lower restraint 18 by being inserted through a corresponding loop 26 toward the lower rear end 34 of lower restraint 18. The corresponding loops 26 should be chosen to place the rear strap 22 near the animal's chest and stomach. The exact longitudinal placement of strap 22 may be varied by selecting loops 26 for optimum positioning on the animal. Webbing buckle 36 is secured to an end of rear strap 22 to serve as adjustable loop means to vary the size of rear loop 42. The circumference of rear loop 42 should be adjusted to fit snugly about the body of the restrained animal in a manner similar to front loop 38.

Upper restraint 16 and lower restraint 18 are each fabricated from a double length of woven webbing with loops 26 formed by sewing the doubled length together at preselected intervals along the length of the restraints in stitchings 44. The length of a loop 26 should correspond to the width of straps 20 and 22. Stitchings 44 also add shock resistance to belt 10 by distributing the loads and tending to avoid catastrophic failure modes.

As shown in FIG. 2, securement means 24, or securement strap, is an integral continuance of upper restraint 16 and includes webbing buckle 36 serving as adjustable loop means. Webbing buckle 36 allows the securement means to be fastened about a structural member of a vehicle and allows adjustment of securement loop 46. If desired, safety belt 10 may be used as a leash to restrain an animal outside a vehicle with the orientation shown in FIG. 1. However, given the differing purposes of a leash and a safety belt, it is better to reverse the orientation of the front and rear of safety belt 10 on an animal so that the rear strap 22 girds the neck and securement means 24 may better control animal movement.

Figure 3:
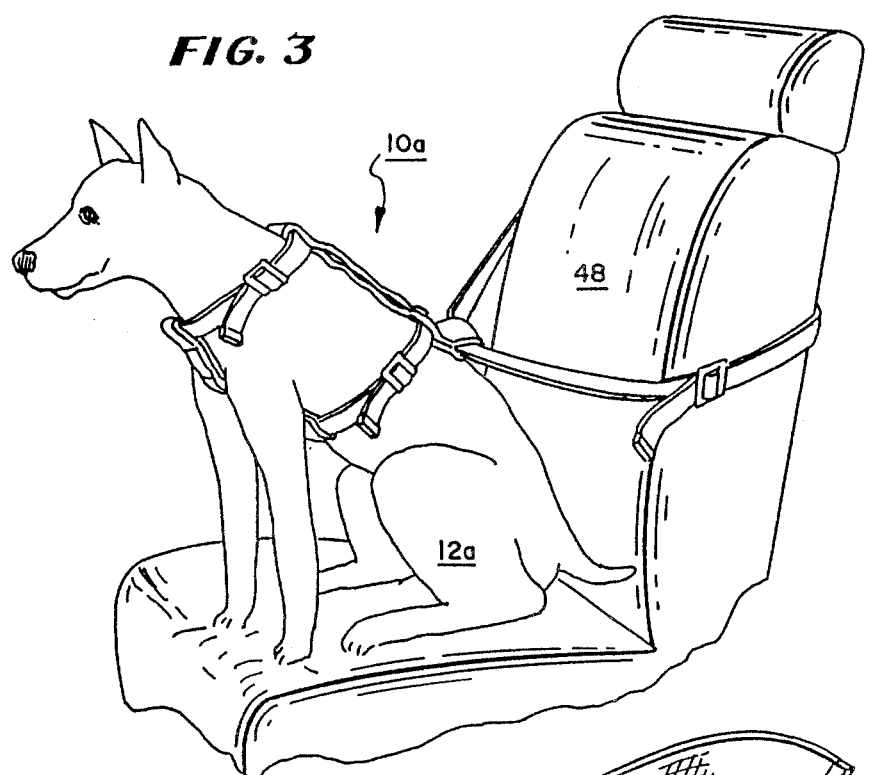
FIG. 3 is similar to FIG. 1 and shows an alternate embodiment of the animal safety belt of the present invention.
Figure 4:
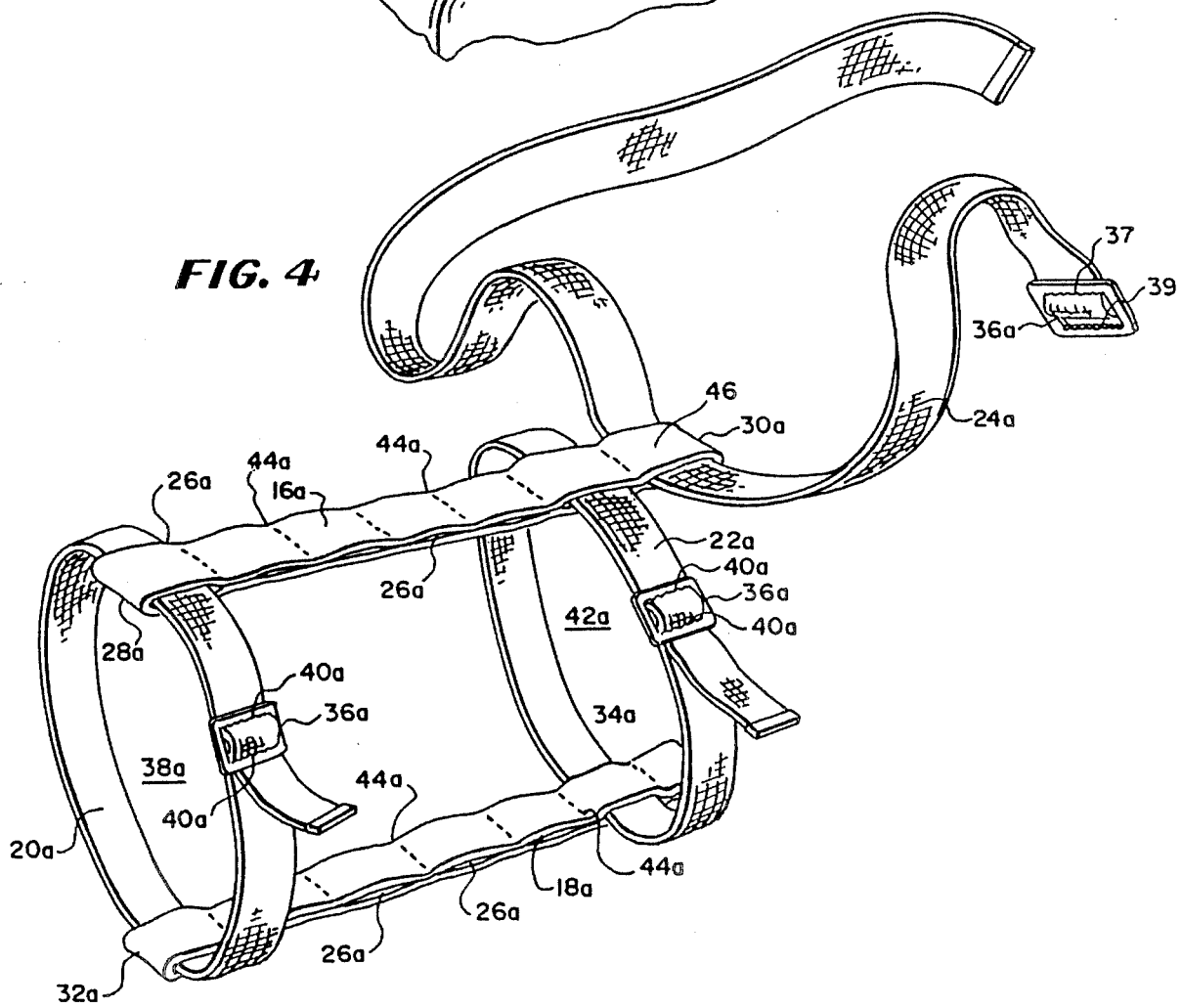
FIG. 4 is an enlarged perspective view of the embodiment of FIG. 3.

The embodiment of the invention shown in FIGS. 3 and 4 has similar elements to the embodiment above discussed. Similar elements are numbered as they are in FIGS. 1 and 2 with the suffix "a." The animal safety belt 10a includes an upper restraint 16a, a lower restraint 18a, a front strap 20a, a rear strap 22a and securement means 24a. Preferably restraints 16a, 18a, straps 20a, 22a and securement means 24a are each fabricated from a woven webbing. The use of woven webbing tends to better absorb shock loads and facilitate the stability of the safety belt fitting on an animal. Upper restraint 16a has loops 26a extending through restraint 16a disposed at preferably even intervals between upper front end 28a and upper rear end 30a to serve as upper attachment means. Similarly, lower restraint 18a has loops 26a extending through restraint 18a disposed at even intervals between lower front end 32a and lower rear end 34a to serve as lower attachment means. Loops 26a extend transversely to the lengths of restraints 16a and 18a. Front strap 20a is secured to upper restraint 16a by being inserted through a loop 26a adjacent upper front end 28a. Similarly, front strap 20a is secured to lower restraint 18a by being inserted through a loop 26a adjacent lower front end 32a. Webbing buckle 36a is secured near an end of front strap 20a to serve as adjustable loop means to vary the size of front loop 38a. The circumference of front loop 38a should be adjusted to fit snugly about the neck of a restrained animal. Webbing buckle 36a defines webbing orifices 37a, 39a for receiving strap 20a, and the stability of adjustment is enhanced by opposing teeth 40a engaging the webbing of front strap 20a to oppose strap movement in either direction. Rear strap 22a is secured to upper restraint 16a by being inserted through a loop 26a toward the upper rear end 30a of upper restraint 16a. Similarly, rear strap 22a is secured to lower restraint 18a by being inserted through a corresponding loop 26a toward the lower rear end 34a of lower restraint 18a. The corresponding loops 26a should be chosen to place the rear strap 22a near the animal's chest and stomach. The exact longitudinal placement of rear strap 22a may be varied by appropriately selecting loops 26a for optimum positioning on the animal. Webbing buckle 36a is secured to an end of rear strap 22a to serve as adjustable loop means to vary the size of rear loop 42a. The circumference of rear loop 42a should be adjusted to fit snugly about the body of the restrained animal in a manner similar to front loop 38a.

Upper restraint 16a and lower restraint 18a are each fabricated from a double length of woven webbing with loops 26a formed by sewing the doubled length together at preselected intervals along the length of the restraints in stitchings 44a. The length of a loop 26a should correspond to the width of straps 20a and 22a. Stitchings 44a also add shock resistance to belt 10a by distributing the loads and tending to avoid catastrophic failure modes.

This embodiment of animal safety belt 10a principally differs from the animal safety belt 10 in the provision of rearmost loop 46 and the non-integral securement means 24a. Securement means 24a includes webbing buckle 36a. Webbing buckle 36a allows the securement means to be fastened about a structural member of a vehicle and allows adjustment of securement loop 46a. FIG. 3 shows securement means 24a fastened about a passenger seat 48. If desired, safety belt 10a may also be used with securement means acting as a leash to restrain an animal outside a vehicle. Additionally, in this embodiment of safety belt 10a, securement means 24a may be readily removed from rear most loop 46 and the animal can freely roam without discomfort.

FURTHER EMBODIMENTS

Further embodiments of this application illustrated in FIGS. 5 through 14 principally involve the use of binding means 50 in lieu of securement means 24. A similar convention will be followed in that suffix "b" will be used for FIGS. 5 and 6, suffix "c" will be used for FIGS. 7 and 8, suffix "d" will be used for FIGS. 9 and 10, suffix "e" will be used for FIGS. 11 and 12, and suffix "f" will be used for FIGS. 13 and 14 for similar elements of the invention.

Binding means 50 fastens a restraint 16, 18 to a structural element of a vehicle or to a vehicular part, such as a seat belt for humans 52 leading to a vehicular structural element. Seat belt 52 may be considered a structural element since it is designed to accept the shock loading which may be transmitted to it. However, for the purpose of distinguishing among structural elements, seat belt 52 is separately illustrated. The structural element can include a variety of hardware designed to accept shock loading which may be transmitted to it for the purposes of this application. An illustrative list of such hardware includes such things as ring bolts, tie downs, channel, and accessible tubular elements, not all of which are illustrated in the drawing. Some structural elements are open, that is, allowing a closed non-openable interconnecting piece to be selectively interconnected with the structural element. Others are closed, requiring that an interconnecting piece be openable to interconnect with the structural element. An example of a closed structural element would be a typical, forged, closed ring bolt. An example of an openable structural element would be a ring bolt with a spring-loaded gate.

Figure 5:
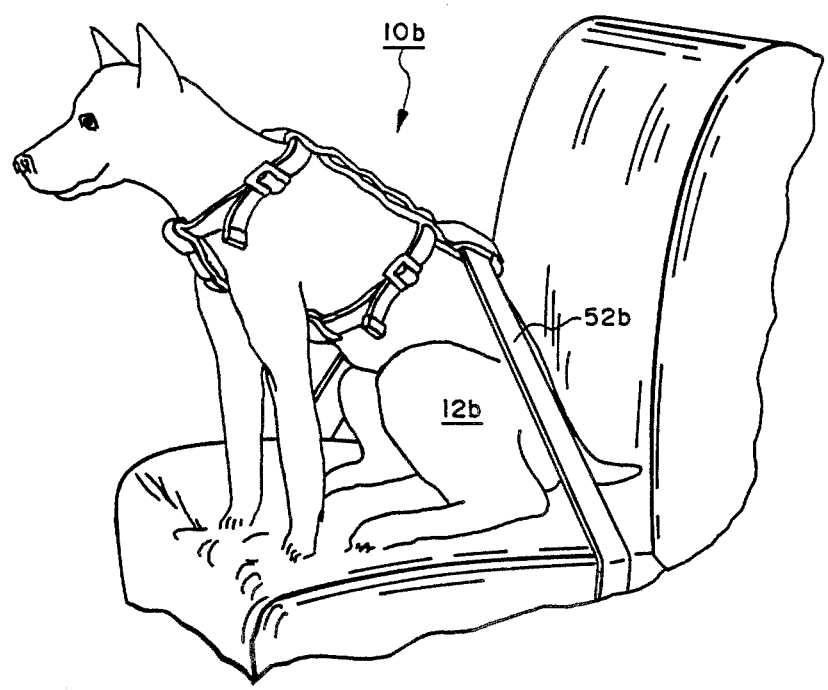
FIG. 5 is a perspective view of an alternate embodiment of the animal safety belt of the present invention showing a restrained dog in a vehicle seat.
Figure 6:
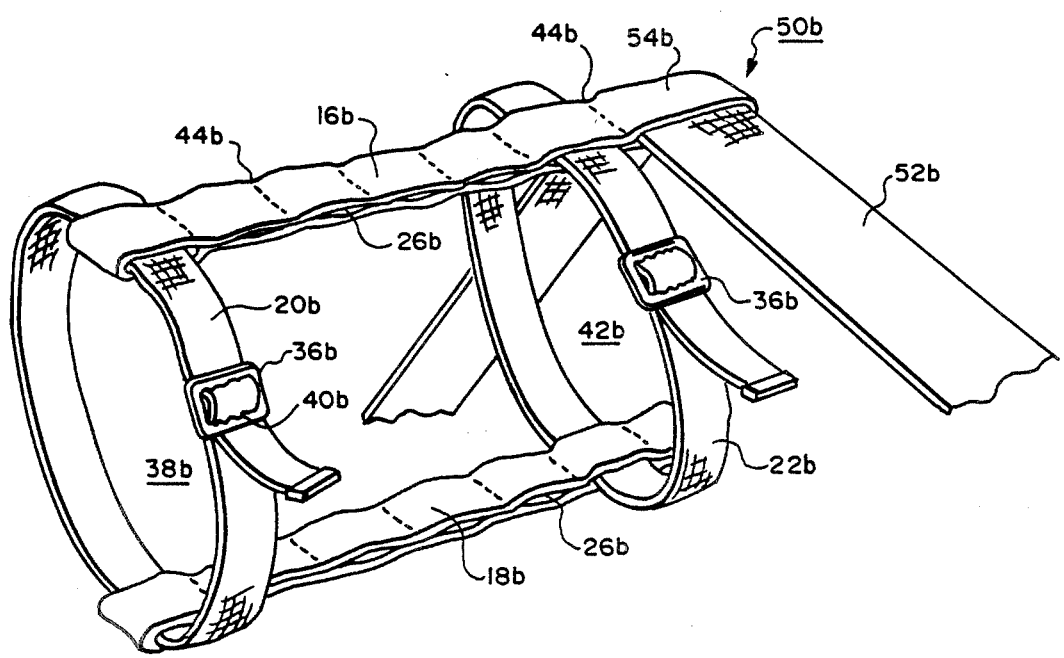
FIG. 6 is an enlarged partial perspective view of the embodiment of FIG. 5.

FIGS. 5 and 6 illustrate binding means 50b securely interconnected with a seat belt for humans 52b by receiving the seat belt for humans 52b within binding loop 54b. Binding loop 54b is formed in upper restraint 16b in the same fashion that the other loops 26b are formed and, of course, must be sufficiently large to accept the passage of the seat belt for humans 52b through binding loop 54b.

Figure 7:
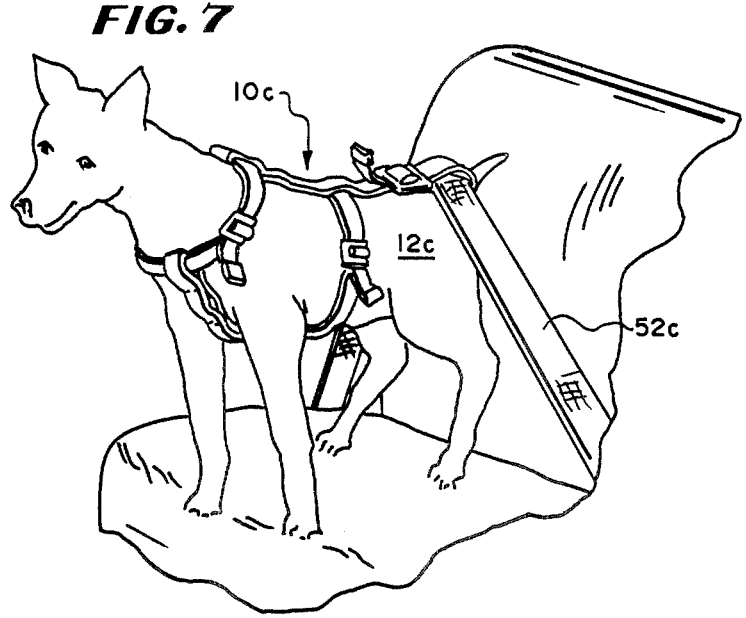
FIG. 7 is a perspective view of an alternate embodiment of the animal safety belt of the present invention showing a restrained dog in a vehicle seat.
Figure 8:
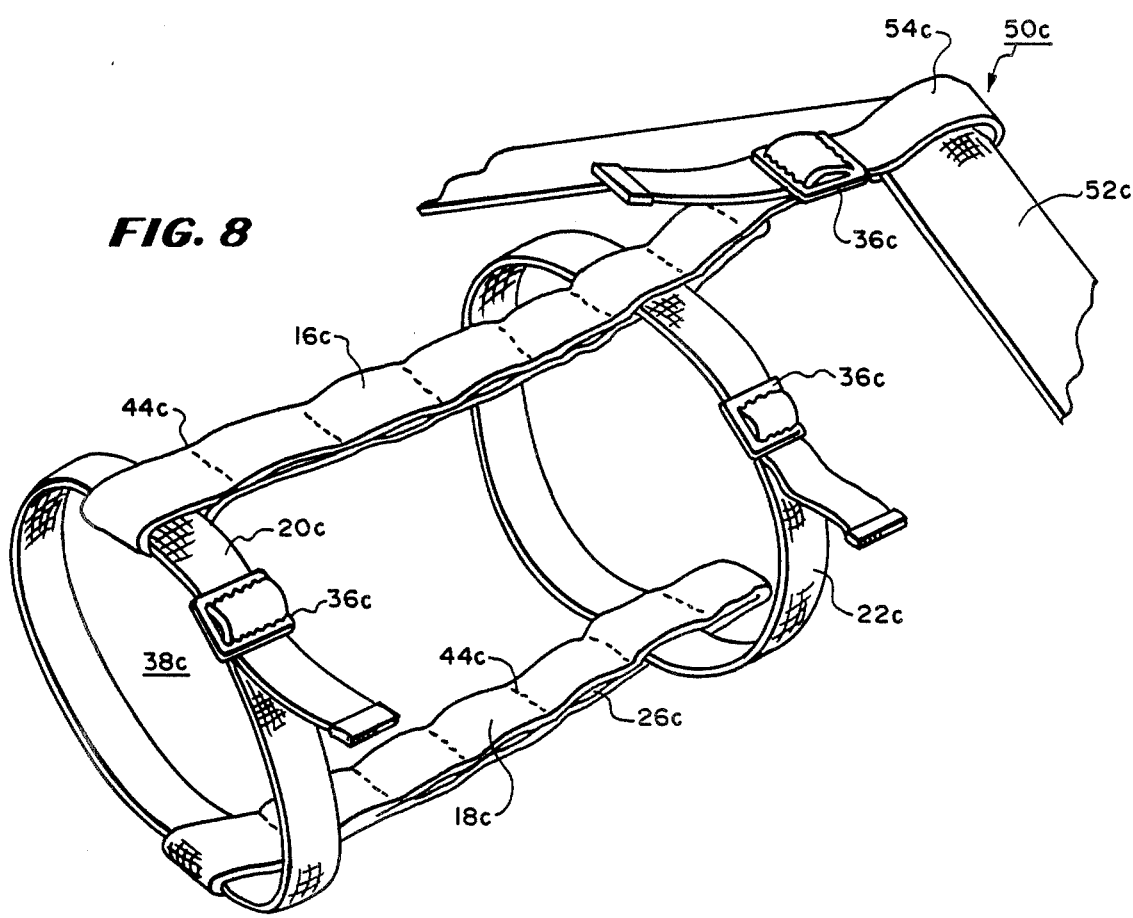
FIG. 8 is an enlarged partial perspective view of the embodiment of FIG. 7.

The embodiment of binding means 50c shown in FIGS. 7 and 8 principally differs from that shown in FIGS. 5 and 6 by the inclusion of adjustable loop means, namely webbing buckle 36c, allowing the opening of binding loop 54c and an adjustment of its perimeter. This embodiment is particularly useful where the seat belt for humans 52c is an integral lap and seat belt assembly (not shown) which is similar to a closed structural element. This embodiment could be used with any closed structural element such as a gateless ring bolt.

FIGS. 9 through 14 show embodiments of the animal safety belts 10d, 10e, and 10f of the present invention, which are preferably employed in a bed 56 of a truck.

Figure 9:
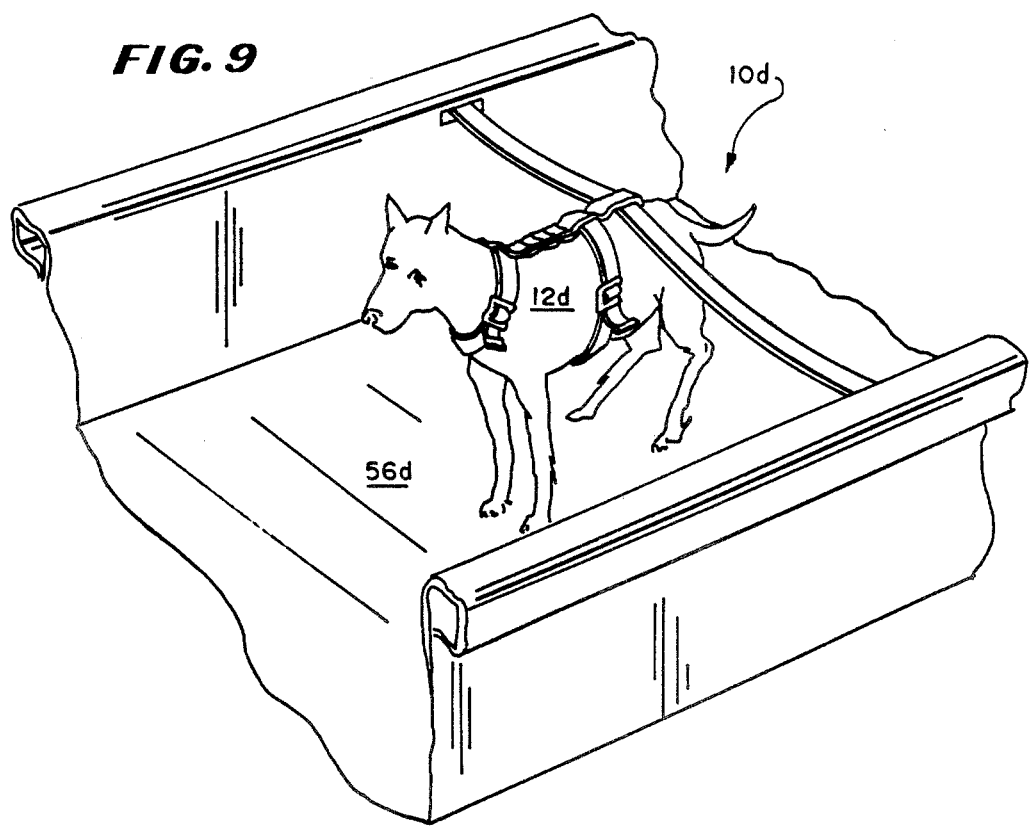
FIG. 9 is a perspective view of an alternate embodiment of the animal safety belt of the present invention showing a restrained dog in a truck bed.
Figure 10:
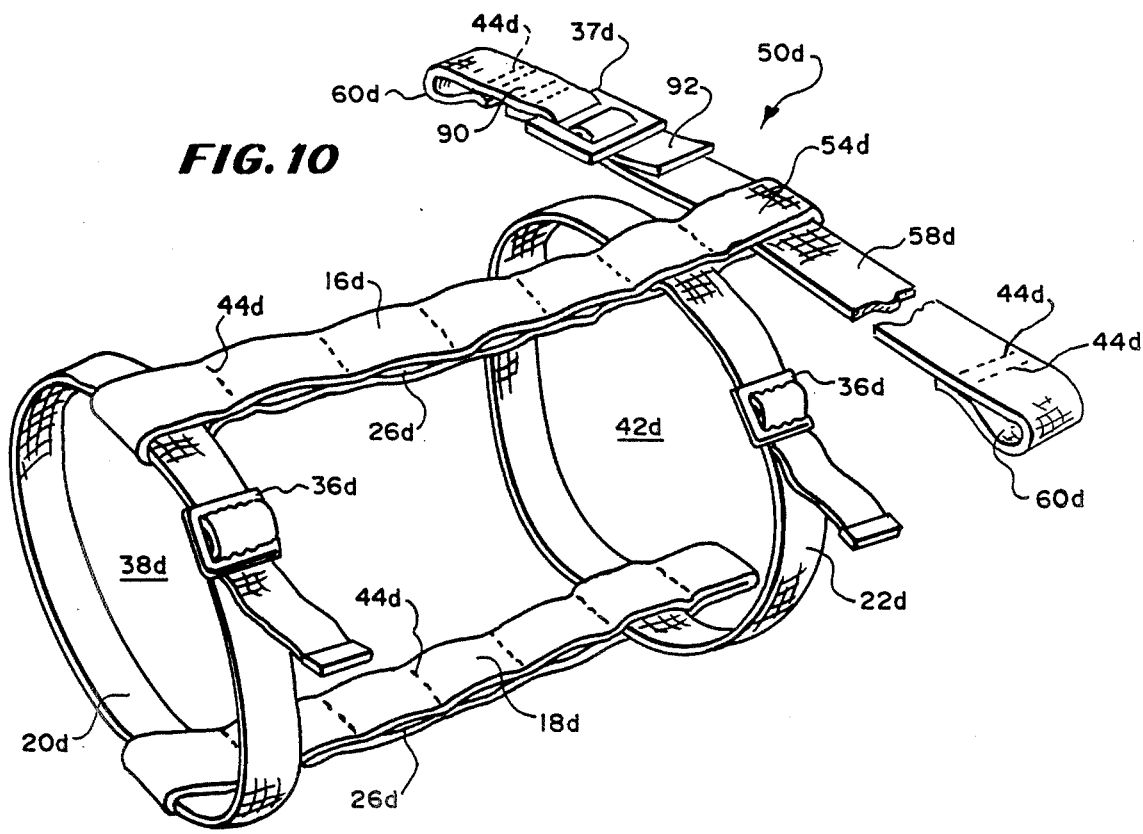
FIG. 10 is an enlarged partial perspective view of the embodiment of FIG. 9.

FIGS. 9 and 10 illustrate animal safety belt 10d with binding means 50d. Binding means 50d includes binding loop 54d and binding strap 58d. Binding loop 54d is substantially identical to binding loop 54b of FIG. 6. Binding strap 58d is received within closed binding loop 54d and includes an adjustable loop means, namely tension webbing buckle 37d which allows upper restraint 16d to be detached from binding strap 58d. Tension webbing buckle 37d (later described) also allows adjustment in the effective length of binding strap 58d to accommodate the variance in widths among truck beds and the various locations of structural elements. At opposite ends of binding strap 58d are end loops 60d acting as tie down means. End loops 60d are of the closed variety, formed by doubling a portion of the woven webbing of binding strap 58d on itself and stitching the free end to a portion of the woven web, as shown at 44d. End loops 60d are closed loops and must, therefore, be employed with an open truck structural element, such as a horizontal post or a tie down (not shown).

Figure 11:
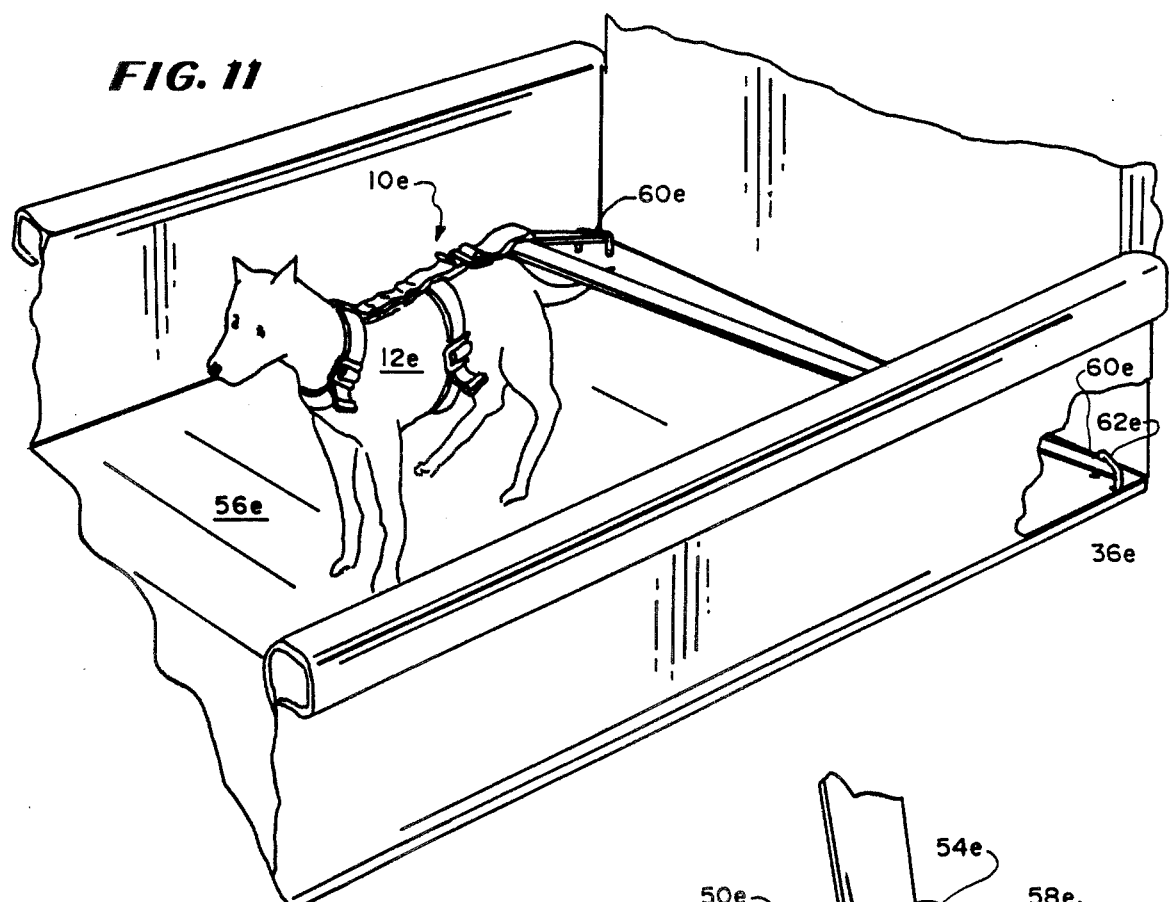
FIG. 11 is a perspective view of an alternate embodiment of the animal safety belt of the present invention showing a restrained dog in a truck bed.
Figure 12:
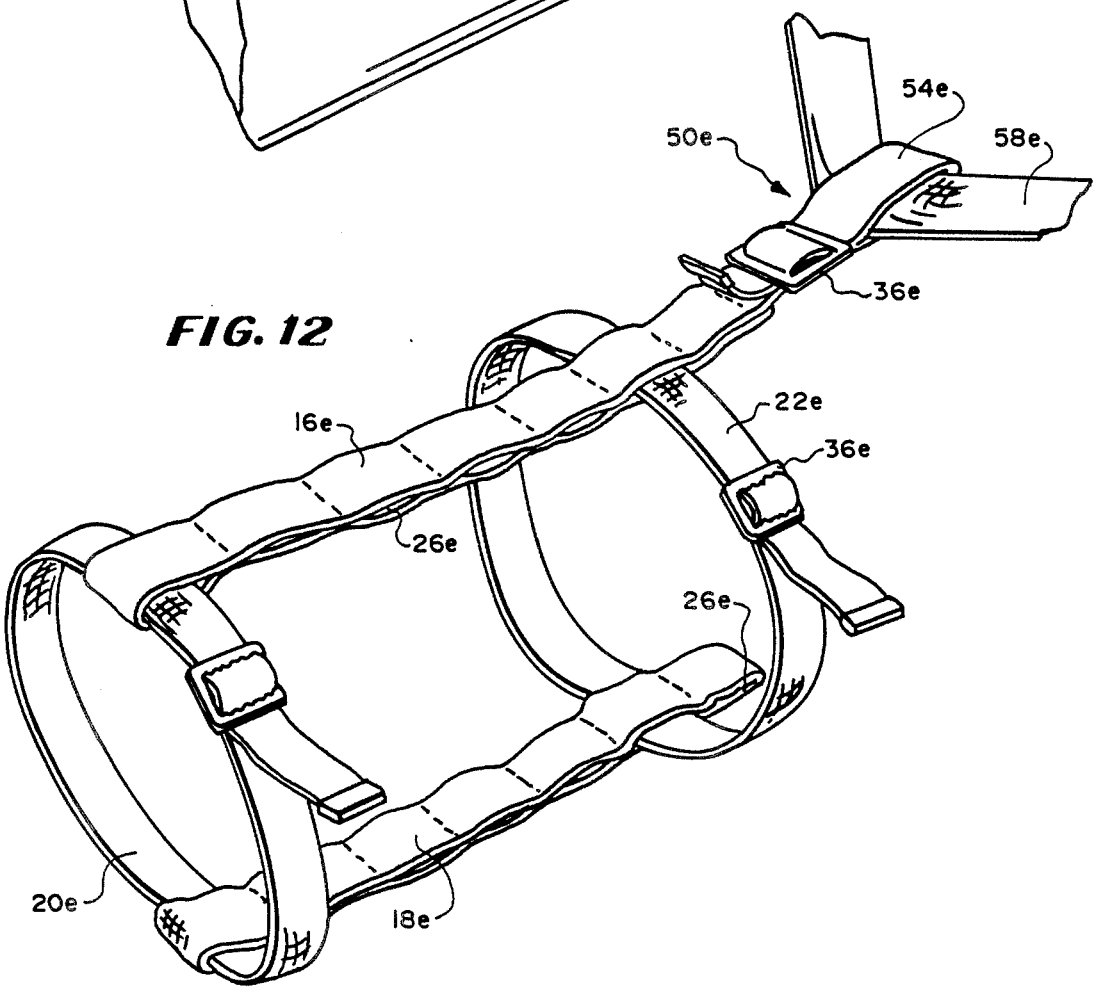
FIG. 12 is an enlarged partial perspective view of the embodiment of FIG. 11.

The embodiment of the animal safety belt 10e shown in FIGS. 11 and 12 employs binding means 54e to secure upper restraint 16e to a truck structural element. Binding means 50e has binding loop 54e to receive binding strap 58e. Binding loop 54e is substantially identical to binding loop 54c shown in FIG. 8. Binding strap 58e differs from binding strap 58d (FIG. 10) in that end loops 60e are of an open nature having an adjustable loop means, namely webbing buckle 36e, to allow the ends of binding strap 58e to be passed around a closed structural element, such as ring bolt 62e. Of course, this also allows the effective length of binding strap 58e to accommodate varying truck bed widths and locations of structural elements.

Figure 13:
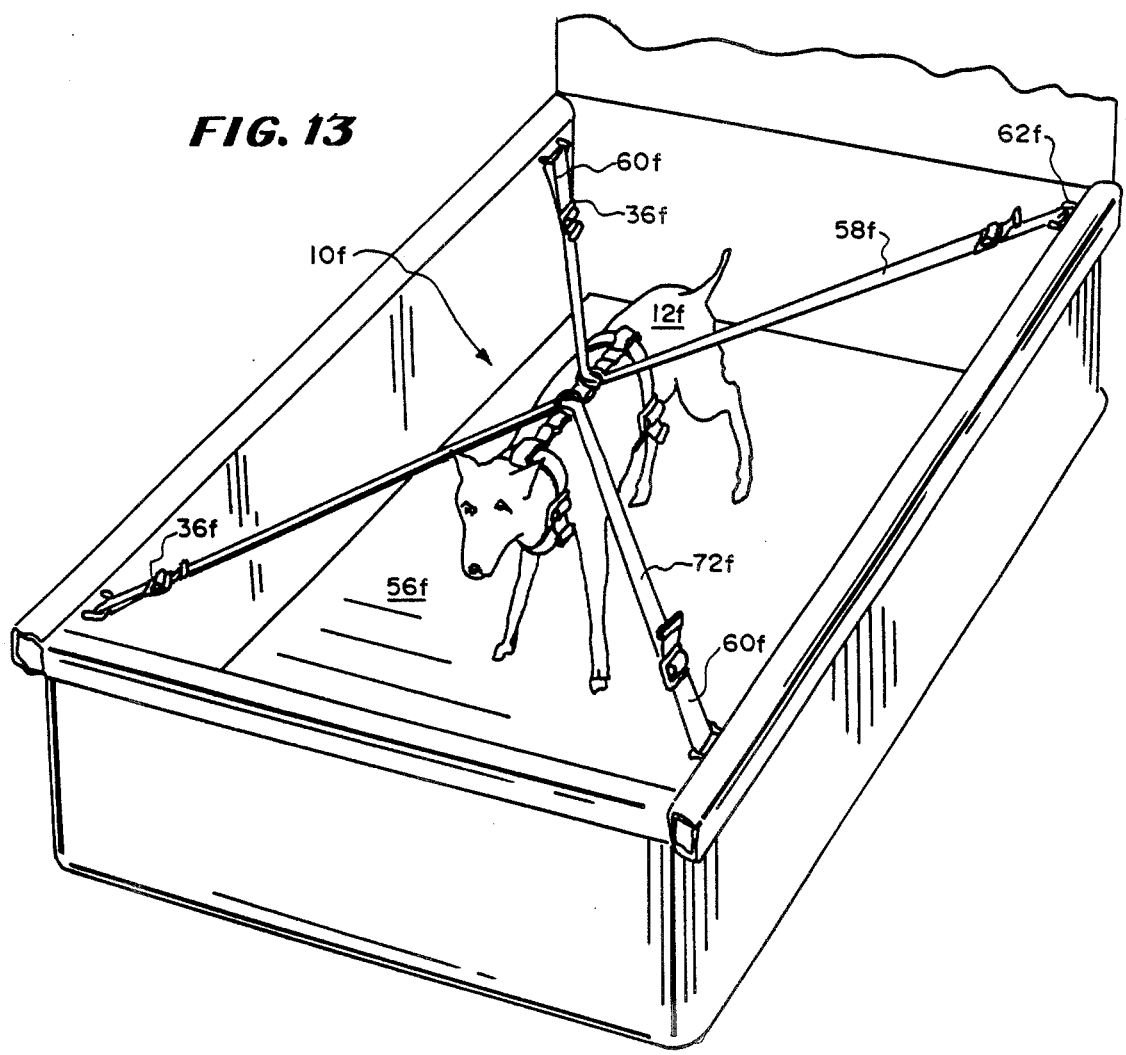
FIG. 13 is a perspective view of an alternate embodiment of the animal safety belt of the present invention showing a restrained dog in a truck bed.
Figure 14:
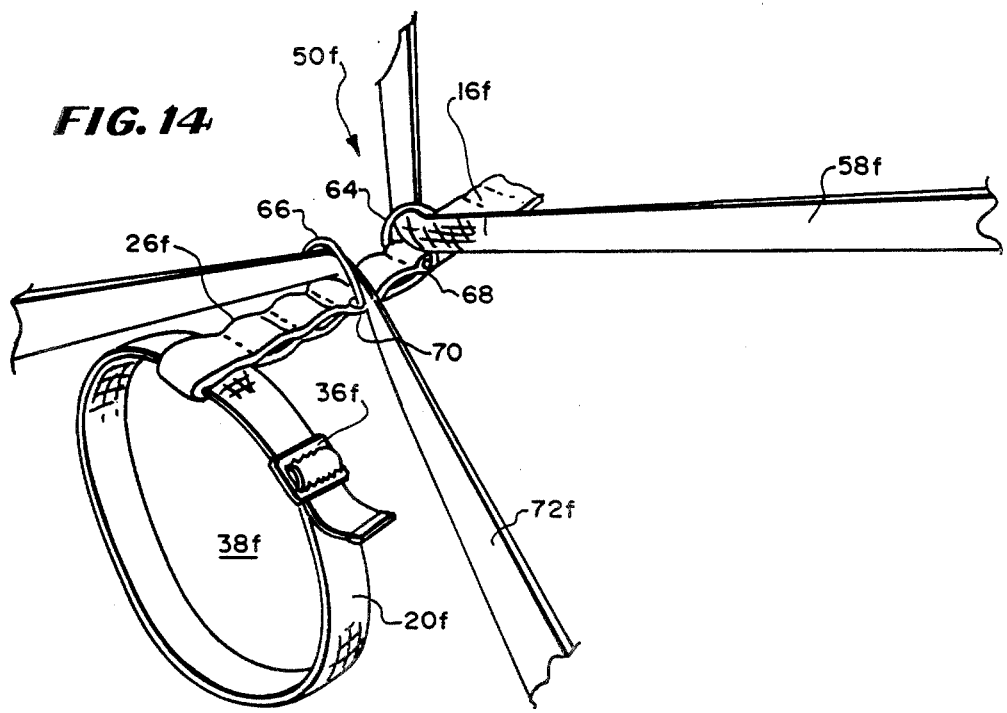
FIG. 14 is an enlarged partial perspective view of the embodiment of FIG. 13.

FIGS. 13 and 14 illustrate the embodiment of animal safety belt 10f employing binding means 50f. Binding means 50f differs from the binding means 50 previously shown and from securement means 24 in a variety of ways. A binding loop 54 of the style previously shown is not present and its function is served by binding ring 64 or second binding ring 66 in conjunction with binding ring 64. Binding rings 64, 66 are preferably integrally formed D-shaped rings received in first 68 and second 70 loops stitched in upper restraint 16f. First loop 68 and second loop 70 are located toward the middle region of upper restraint 16f and should be spaced a predetermined distance from each other so that animal 12f is restrained from movement in any direction. First binding ring 64 receives binding strap 58f, and second binding ring 66 receives second binding strap 72f. Each binding strap 58f, 72f has end loops 60f at opposite ends to receive a truck structural element, here shown as ring bolt 62f. Since ring bolt 62f is a closed structural element, end loops 60f must have the ability to be opened, and webbing buckles 36f are provided for that purpose. Additionally, webbing buckles serve to adjust the effective length of their respective binding straps 58f, 72f, as does the adjustable loop means of earlier shown embodiments. For purposes of clarity, FIG. 14 omits the showing of lower restraint 18d and rear strap 24d, which are present in the animal safety belt 10f shown in FIG. 13.

Figure 15:
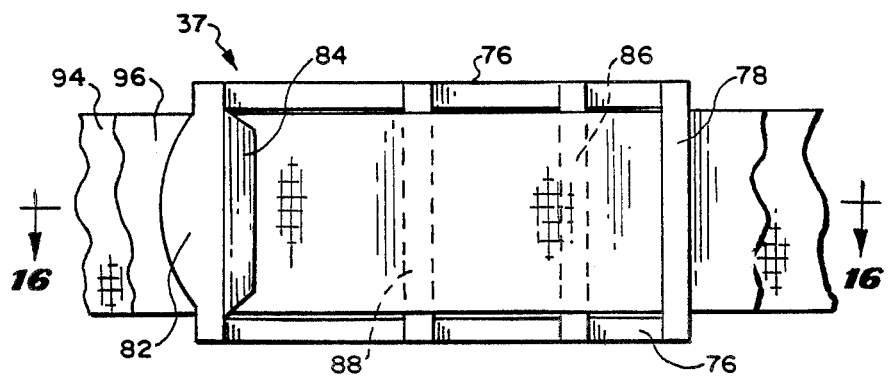
FIG. 15 is an isolated bottom view of a buckle employed in the present invention.
Figure 16:
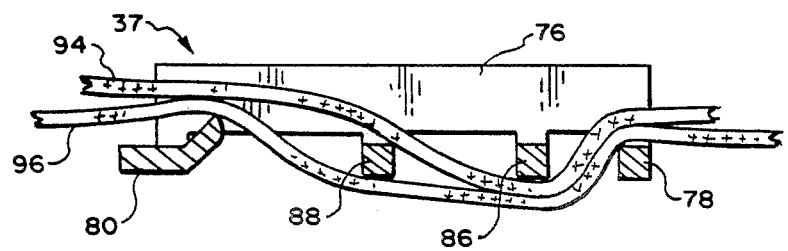
FIG. 16 is a cross section of FIG. 15 with associated webbing superimposed upon it.

FIGS. 15 and 16 show tension webbing buckle 37 in isolation. Tension webbing buckle 37 principally differs from webbing buckle 36 by lacking teeth and being of a double bar type. Buckle 37, in response to tension on the webbing 74 contained within buckle 37, causes adjacent portions of webbing 74 to be forced into frictional engagement with each other and prevents relative movement between them. Buckle 37 is generally rectangular and has a perimeter defined by two side flanges 76, a hinge bar 78 connecting the top surfaces of side flanges 76 at a hinge end and lever bar 80 connecting the top surfaces of side flanges 76 at a lever end. Lever bar 80 includes tab 82 and lip 84. Lip 84 extends from the top surface into a median region of the side flanges 76. Side flanges 76 are likewise connected by hinge locking bar 86 adjacent hinge bar 78 and lever locking bar 88 adjacent lever bar 80. As a result, when tension is applied to the webbing contained in buckle 37, lip 84 tends to force adjacent portions of the webbing into locking frictional engagement. FIG. 10 shows one embodiment of how this is achieved. A first portion 90 of strap 58d is looped about hinge bar 78 and the tag end of the loop strap sewn to the main portion. A second portion 92 of strap 58d is inserted under lever bar 80 and lever locking bar 86, looped over lever locking bar 86 and exits buckle 37 under lever bar 80. When tension is applied to strap 58d, lip 84 forces the inserted and exiting parts of second portion 92 into locking frictional engagement. This embodiment is particularly suitable to form the adjustable loop means of the front 20 and rear 22 straps.

Figure 17:
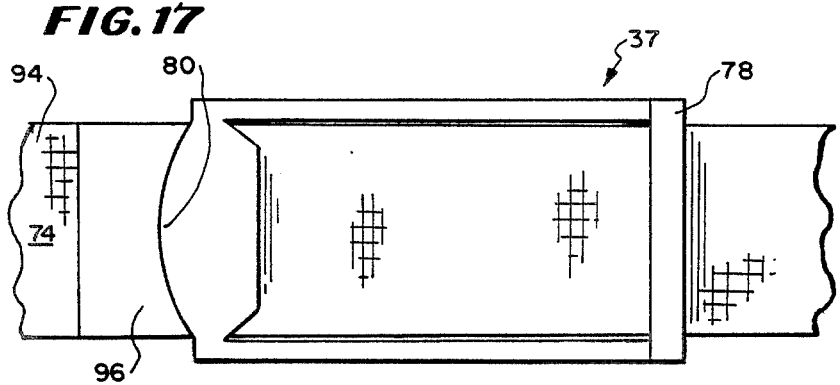
FIG. 17 is a partial top view of an alternate use of the buckle of FIG. 15 in the animal safety belt of the present invention.

A second embodiment of how locking frictional engagement is achieved is shown in FIG. 17. This embodiment is particularly suitable where the webbing is to remain integral, for example in binding loop 54e or end loops 60e. Webbing 74 is directly or indirectly connected to a restraint 16 or 18 at restraint end 94. It is inserted under lever bar 80 and lever locking bar 88 and then brought over hinge locking bar 86 to exit buckle 37 under hinge bar 78. Free end 96 is then re-inserted between the existing part of the webbing and the underside of hinge bar 78 to form a loop (not shown) adjacent the hinge end of buckle 37. The free end 96 is then brought over the hinge locking bar 86 and the webbing above it, and the lever locking bar 88 and re-exited between the inserted portion of the webbing and the underside of lip 84. It should be understood that the term locking buckle as used herein means either the webbing buckle 36 which has teeth 40 to engage a broad surface of webbing or tension buckle 37 which employs a lip to cause locking frictional engagement between contingent broad surfaces of webbing. Either may be used to form adjustable loop means or adjust the effective length of webbing associated with the locking buckle.

While various embodiments of the animal safety belt of the present invention have been described above, it is to be understood that additional variations and modifications can be made to the animal safety belt of the present invention without departing from the teachings of the present invention. Some of the advantages and features of the animal safety belt are discussed, others are inherent. Accordingly, the scope of the invention is only to be limited as necessitated by the accompanying claims.

From the foregoing description, it will be apparent that modifications can be made to the animal safety belt of the present invention without departing from the teachings of the invention. Also, it will be appreciated that the invention has a number of advantages, some of which have been described above and others of which are inherent in the invention. Accordingly, the scope of the invention is only to be limited as necessitated by the accompanying claims.

I claim:

1. An animal safety belt for restraining an animal in a vehicle which is equipped with a seat belt for humans, said animal safety belt comprising:
   an upper restraint of predetermined length having at least three upper attachment means for slidably attaching straps, said upper restraint adapted to be disposed adjacent the spine of the animal;
   a lower restraint of predetermined length having at least three lower attachment means for slidably attaching straps, said lower restraint adapted to be disposed adjacent the stomach and chest of the animal;
   a front strap including adjustable loop means for adjusting the circumference of a front loop, said front loop slidably attached a forward of said upper attachment means and a forward of said lower attachment means;
   a rear strap including adjustable loop means for adjusting the circumference of a rear loop, said rear loop slidably attached to a rearward attachment means of said upper restraint and a corresponding attachment means of said lower restraint;
   binding means affixed to the rear of a restraint, rearward of said rear strap for securing said restraint to the vehicle seat belt for humans and for maintaining a relatively fixed distance between said front and rear straps when force is applied to said restraining means;
   said restraints secured to the animal by said straps, whereby the animal is secured to the vehicle seat belt for humans.

2. The safety belt of claim 1 wherein said attachment means are disposed at even intervals throughout the lengths of the restraints.

3. The safety belt of claim 1 wherein said attachment means are loops extending through said restraints transversely to the lengths of the restraints.

4. The safety belt of claim 3 wherein said restraints, straps, and binding means are woven webbing to absorb shock loads.

5. The safety belt of claim 4 wherein said adjustable loop means is a locking buckle receiving webbing.

6. The safety belt of claim 5 wherein said binding means comprises a binding loop at the rear of said upper restraint with the vehicle seat belt for humans received by said binding loop.

7. The safety belt of claim 6 wherein said binding loop includes an adjustable loop means for securing said binding means to the vehicle seat belt for humans.

8. The safety belt of claim 7 wherein said adjustable loop means is a locking buckle receiving webbing.

9. The safety belt of claim 6 wherein said binding loop and said upper restraint are a continuous length of webbing.

10. The safety belt of claim 9 wherein the continuous length of webbing is integral.

11. An animal safety belt for restraining an animal in a truck which has a truck bed including truck structural elements, said animal safety belt comprising:
    an upper restraint of predetermined length fabricated from woven webbing folded on itself for a greater portion of its length to be disposed along the animal's spine;
    a lower restraint of predetermined length fabricated from woven webbing folded on itself for a greater portion of its length to be disposed along the animal's chest and stomach;
    loops formed in said upper and lower restraint by stitching a length of the folded webbing transversely to the length of the restraints at corresponding predetermined intervals;
    a front strap including adjustable loop means for adjusting the circumference of a front loop to be disposed adjacent the base of the animal's neck, said front strap attached to said restraints by being inserted through forward loops of said upper and said lower restraints;
    a rear strap including adjustable loop means for adjusting the circumference of a rear loop to be disposed adjacent an animal's body near the abdominal region, said rear strap attached to said restraints by being inserted through a rearward loop of said upper restraint and a rearward loop of said lower restraint; and binding means affixed to the rear of a restraint for securing said restraint to the truck structural element.

12. The safety belt of claim 11 wherein said loops are disposed at even intervals throughout the lengths of the restraints.

13. The safety belt of claim 11 wherein said straps and binding means are woven webbing.

14. The safety belt of claim 13 wherein said adjustable loop means is a locking buckle receiving webbing.

15. The safety belt of claim 13 wherein said binding means comprises:
   a binding loop at the rear of said upper restraint;
   a binding strap received by said binding loop; and
   tie down means for securing said binding strap to the truck structural elements at opposite ends of said binding strap.

16. The safety belt of claim 15 wherein said binding loop includes a binding adjustable loop means for securing said binding strap within said binding loop.

17. The safety belt of claim 16 wherein said binding adjustable loop means is a locking buckle receiving webbing.

18. The safety belt of claim 15 wherein said tie down means are end loops each receiving a truck structural element.

19. The safety belt of claim 18 wherein said binding strap includes a locking buckle receiving webbing.

20. The safety belt of claim 18 wherein said end loops include end adjustable loop means.

21. The safety belt of claim 20 wherein said end adjustable loop means includes a locking buckle receiving webbing.

22. An animal safety belt for restraining an animal in a truck which has a truck bed including truck structural elements, said animal safety belt comprising:
   an upper restraint of predetermined length fabricated from woven webbing folded on itself for a greater portion of its length to be disposed along the animal's spine;
   a lower restraint of predetermined length fabricated from woven webbing folded on itself for a greater portion of its length to be disposed along the animal's chest and stomach;
   loops formed in said upper and lower restraint by stitching a length of the folded webbing transversely to the length of the restraints at corresponding predetermined intervals;
   a front strap including adjustable loop means for adjusting the circumference of a front loop to be disposed adjacent the base of the animal's neck, said front strap attached to said restraints by being inserted through forward loops of said upper and said lower restraints;
   a rear strap including adjustable loop means for adjusting the circumference of a rear loop to be disposed adjacent an animal's body near the abdominal region, said rear strap attached to said restraints by being inserted through a rearward loop of said upper restraint and corresponding loop of said lower restraint; and
   binding means affixed to a restraint for securing said restraint to the truck structural element.

23. The safety belt of claim 22 wherein said binding means comprises:
   at least one binding ring received in at least one loop of said upper restraint;
   a first binding strap received within said at least one binding ring; and
   a second binding strap received within said at least one binding ring.

24. The safety belt of claim 23 further including:
   a second binding ring received in a second loop of said upper restraint, said second loop spaced at a predetermined distance from said at least one first loop receiving said at least one binding ring;
   said first binding strap being received by said at least one binding ring; and
   said second binding strap being received by said second binding ring.

25. The safety belt of claim 24 wherein said first and second binding straps each include a locking buckle receiving webbing.

26. The safety belt of claim 25 wherein said first and second binding straps each include:
   end loops receiving the truck structural elements.

27. The safety belt of claim 26 wherein said end loops each include adjustable end loop means.

28. The safety belt of claim 27 wherein said adjustable end loop means is a locking buckle receiving webbing.

* * * * *